United States Patent
Otohata et al.

(10) Patent No.: US 8,283,061 B2
(45) Date of Patent: Oct. 9, 2012

(54) FILM-ENCASED ELECTRIC DEVICE AND PRODUCTION METHOD THEREFOR

(75) Inventors: Makihiro Otohata, Kanagawa (JP); Hiroshi Yageta, Kanagawa (JP)

(73) Assignee: NEC Corporation, Tokyo (JP)

( * ) Notice: Subject to any disclaimer, the term of this patent is extended or adjusted under 35 U.S.C. 154(b) by 1405 days.

(21) Appl. No.: 11/573,538

(22) PCT Filed: Aug. 5, 2005

(86) PCT No.: PCT/JP2005/014428
§ 371 (c)(1),
(2), (4) Date: Feb. 9, 2007

(87) PCT Pub. No.: WO2006/016535
PCT Pub. Date: Feb. 16, 2006

(65) Prior Publication Data
US 2008/0233468 A1      Sep. 25, 2008

(30) Foreign Application Priority Data
Aug. 11, 2004   (JP) ................................. 2004-234524

(51) Int. Cl.
*H01M 2/12*       (2006.01)
*B29C 65/00*      (2006.01)

(52) U.S. Cl. .......................................... 429/53; 156/87

(58) Field of Classification Search .............. 429/53–56, 429/163, 178, 181, 185
See application file for complete search history.

(56) References Cited

U.S. PATENT DOCUMENTS

| 4,613,550 | A  | * | 9/1986 | Jergl et al. ...................... 429/53 |
| 5,601,946 | A  | * | 2/1997 | Hattori et al. ................. 429/206 |
| 6,395,420 | B1 |   | 5/2002 | Komatsu |
| 2002/0086201 | A1 | * | 7/2002 | Payen et al. ..................... 429/53 |
| 2009/0081542 | A1 |   | 3/2009 | Yageta et al. |

FOREIGN PATENT DOCUMENTS

| CN | 1271183 A   | 10/2000 |
| EP | 1063713 A2  | 12/2000 |
| JP | 05-013061 A | 1/1993 |
| JP | 10-055792 A | 2/1998 |

(Continued)

OTHER PUBLICATIONS

Exhibit: Google On Line Thermo Set Material.*

(Continued)

*Primary Examiner* — Melvin C Mayes
*Assistant Examiner* — Bijay Saha
(74) *Attorney, Agent, or Firm* — Sughrue Mion, PLLC

(57) ABSTRACT

A releasing pressure and a pressure releasing position, when enclosing films are expanded by gas produced at an abnormal time, are easily and positively configured. A film-enclosed battery (1) has a battery element (2) and two enclosing films (4, 5) for sealing the battery element (2). The enclosing films (4, 5) include heat-sealable resin layers and air-impermeable layers, and the heat-sealable resin layers and air-impermeable layers, and the heat-sealable resin layers that are face each other hold the battery element (2) and seal the battery element (2) when their peripheral edges are thermally fused. A cross-linking structure (8) formed by cross-linking heat-sealable resin layer is formed in one of the enclosing films (4, 5) so that a region in part of a heat-sealed area (6) has a position exposed to a battery element housing unit and another portion in contact with outside air.

20 Claims, 9 Drawing Sheets

FOREIGN PATENT DOCUMENTS

| | | |
|---|---|---|
| JP | 11086823 A | 3/1999 |
| JP | 11-097070 A | 4/1999 |
| JP | 3063924 B2 | 5/2000 |
| JP | 2000-235845 A | 8/2000 |
| JP | 2001-266814 A | 9/2001 |
| JP | 2002-056835 A | 2/2002 |
| JP | 2002-319379 A | 10/2002 |
| JP | 2002-324526 A | 11/2002 |
| JP | 2002-362617 A | 12/2002 |
| JP | 2003-045380 A | 2/2003 |
| JP | 2003-132868 A | 5/2003 |
| JP | 2003-242952 A | 8/2003 |
| JP | 2004 055290 * | 2/2004 |
| JP | 2004-055290 A | 2/2004 |
| JP | 2004-213963 A | 7/2004 |
| JP | 2005-203262 A | 7/2005 |
| JP | 2006-054099 A | 2/2006 |

OTHER PUBLICATIONS

Office Action issued May 28, 2012 by the State Intellectual Property Office of the People's Republic of China in counterpart Chinese Application No. 200580027306.5.

* cited by examiner

US 8,283,061 B2

FILM-ENCASED ELECTRIC DEVICE AND PRODUCTION METHOD THEREFOR

This application claims priority from PCT Application No. PCT/JP2005/014428 Aug. 5, 2005 and from Japanese Patent Application No. 2004-234524, filed Aug. 11, 2004, which applications are incorporated herein by reference.

TECHNICAL FIELD

The present invention relates to an electric device typified by a cell or a capacitor, and more particularly to a film-encased electric device comprising an electric device element such as a chemical cell element, a capacitor element, or the like sealed by an encasing film material, and a method of manufacturing such a film-encased electric device.

BACKGROUND ART

One type of film-encased electric device is a film-encased cell. Heretofore, there has been known a film-encased cell including a cell element sandwiched by encasing films placed on respective opposite sides in the thickness direction thereof and having dimensions greater than the planar dimensions of the cell element, the cell element being hermetically sealed (also simply referred to as "sealed") by the opposite encasing films joined to each other around the cell element. Positive and negative poles tabs are connected as electrodes to the cell element. With the cell element sealed, the tabs extend through the encasing films. Each of the encasing films generally comprises a laminated film comprising a metal layer and a heat-sealable resin layer. The cell element is sealed by the heat-sealable resin layers which are thermally fused to each other.

As with metal cans or the like which employ encasing materials other than film, cells using an encasing film material are required for thermally fused regions to be sealed reliably in order to prevent ambient air from entering the cell and also to prevent the electrolytic solution from leaking out. In particular, sealing reliability is important for cells containing a nonaqueous electrolyte (hereinafter referred to as "nonaqueous electrolyte cell"). If a heat-seal failure occurs, the electrolyte will deteriorate due to exposure to components of the ambient air, resulting in a significant reduction in cell performance.

If a voltage out of the rated range of a cell is applied to the cell while the cell is in use, then gas may be produced due to the electrolysis of the electrolyte solvent. Furthermore, if the cell is used at a high temperature outside of the rated range, then a substance is produced which is responsible for gas due to the decomposition of the electrolyte salt. Basically, it is ideal to use the cell in the rated range so as not to produce gas from the cell. However, an abnormal voltage may possibly be applied in the event of a failure of a control circuit of the cell for some reason, or a high ambient temperature may occur for some reasons, tending to cause the cell to produce a large amount of gas.

The generation of a gas within a cell results in an internal pressure buildup in the cell. In order to prevent the cell from suffering an accidental explosion owing to an extremely high internal pressure buildup, many cells that use a metal can as an encasing member have a pressure safety valve for releasing gas from the cell in the event of an internal pressure buildup in the cell. It is difficult for film-encased cells that use a film as an encasing material to have a pressure safety valve because of structural limitations. If a film-encased cell undergoes internal pressure buildup, then the film will expanded until finally it is ruptured, allowing a gas to be ejected through the rupture. It is impossible to identify a location where such a film rupture will occur. Depending on the location of a film rupture, the cell may possibly adversely affect devices or members in the surrounding area.

There have been proposed some pressure releasing structures for eliminating trouble due to the generation of gas in conventional film-encased cells.

For example, as shown in FIG. 1, JP-A No. 2004-55290 discloses film-encased cell 101 having encasing films 104 that is heat-sealed around a cell element (not shown) to form heat-sealed area 106 including a portion projecting toward a region wherein the cell element is housed. Encasing films 104 have gas releaser 107 with its tip end disposed in the projecting portion of heat-sealed area 106. Gas releaser 107 is formed, but not by heat-sealing process.

When encasing films 104 are expanded by an internal pressure buildup caused by a gas produced in film-encased cell 101, heat-sealed area 106 is subjected to a peel-off stress. Since heat-sealed area 106 includes the projecting portion, the peel-off stress concentrates on the projecting portion of heat-sealed area 106, causing encasing films 104 to peel off progressively more especially in the projecting portion than in other portions thereof. When the peeling of encasing films 104 reaches gas releaser 107, the interior of film-encased cell 101 comes into contact with the ambient air, and gas releaser 107 releases the gas.

DISCLOSURE OF THE INVENTION

The conventional pressure releasing structure described above poses no problem insofar as the peeling of the encasing films occurs between the heat-sealable resin layers of the encasing films that face each other. However, the conventional pressure releasing structure is disadvantageous in that it does not function sufficiently if the encasing films peel off in other regions.

The above disadvantage will be described below with reference to FIGS. 2 through 4.

FIG. 2 is a cross-sectional view of the gas releaser of the film-encased cell shown in FIG. 1. As shown in FIG. 2, encasing films 104 have their heat-sealable resin layers 111 disposed in facing relation to each other. In heat-sealed area 106, heat-sealable resin layers 111 are thermally fused together. Layers outside of heat-sealable resin layers 111 comprise metal layers 112. When internal pressure buildup occurs in the film-encased cell, peel-off stress tending to peel off encasing films 104 is applied to an inner edge of heat-sealed area 106, causing encasing films 104 to peel off progressively while breaking heat-sealable resin layers 111.

If heat-sealable resin layers 111 are broken progressively in the thickness direction of heat-sealable resin layers 111, as shown in FIG. 3, then the peel-off position moves to an interface between heat-sealable resin layer 111 and metal layer 112. Subsequently, the peeling of encasing films 104 progresses along the interface between heat-sealable resin layer 111 and metal layer 112 as indicated by the heavy line in FIG. 3. Finally, as shown in FIG. 4, when the peeling of encasing films 104 reaches the outer edges of encasing films 104, without going through gas releaser 107, the interior of film-encased cell 101 comes into contact with the ambient air, releasing the pressure.

When the peeling of the encasing films progresses along the interface between the heat-sealable resin layer and the metal layer as described above, the gas releaser does not function as a safety valve, and the pressure is not released until the outer edges of the encasing films have peeled off. As a result, the released pressure is increased. After peeling of the encasing films has passed through the projecting portion of the heat-sealed area, since the direction, in which peeling along the interface between the heat-sealable resin layer and the metal layer progresses, has not settled, the pressure releasing position may possibly vary greatly. Therefore, the released pressure and the pressure releasing position of the conventional pressure releasing structure may be liable to become unstable, depending upon how the peeling progresses.

The above problem is not limited to the film-encased cell, but is also found in film-encased electric devices wherein an electric device element that can possibly generate gas is encased by an encasing film.

It is an object of the present invention to provide a film-encased electric device which is capable of easily and reliably setting a released pressure and a pressure releasing position at the time that encasing films are expanded due to the generation of gas in the event of a failure, and a method of manufacturing such a film-encased electric device.

To achieve the above object, a film-encased electric device according to the present invention has an electric device element and encasing films sealing the electric device element. The encasing films have at least respective heat-sealable resin layers, and the device element is surrounded with the heat sealable resin layers that face each other, these resin layers being thermally fused to each other along outer peripheral region thereof to provide a heat-sealable area therealong. The encasing films have an inner space therebetween serving as an electric device element housing which accommodates the electric device element sealed therein. At least one of the encasing films that face each other has a cross-linked structure disposed in a continuous region including a portion of the heat-sealed area and is made of cross-linked resin of the heat-sealable resin layer, the cross-linked structure having a portion exposed to the electric device element housing and another portion held in contact with ambient air.

In the film-encased electric device according to the present invention, the encasing films that face each other have their heat-sealable resin layers thermally fused to each other to seal the electric device element. In the region including the portion of the heat-sealed area, at least one of the encasing films that face each other has the cross-linked structure formed by cross-linking the heat-sealable resin layer in the particular region as described above. When peel-off stress is applied to the heat-sealed area, the encasing films peel off with a smaller force in the region where the cross-linked structure is provided than in other regions. Therefore, when peel-off stress is applied to the heat-sealed area due to internal pressure buildup in the film-encased cell, the encasing films peel off progressively preferentially along the interface between the encasing films that face each other in the region where the cross-linked structure is provided. As a result, a peel-off position and a pressure releasing position are specified, making it easy to configure a released pressure.

In the film-encased electric device according to the present invention, the heat-sealed area should preferably have a projecting sealed portion projecting toward the electric device element housing, the cross-linked structure being disposed in a range including the projecting sealed portion. Since the peel-off stress applied to the heat-sealed area concentrates on the projecting sealed portion, progress of peeling in the region where the cross-linked structure is provided is accelerated. The film-encased electric device should preferably comprise a gas releaser disposed in outer peripheral regions of the encasing films in which the gas releaser vents to the ambient air and is not in contact with the electric device element housing, and the cross-linked structure includes a region held in contact with the gas releaser as the other portion that is held in contact with the ambient air. With this arrangement, a pressure is reliably released through the gas releaser. If a tube is connected to the gas releaser, then a gas discharged when the pressure is released is led to an appropriate position. The cross-linked structure may be provided by cross-linking the heat-sealable resin layer of the encasing film or may be provided by a cross-linked resin sheet fused to the encasing film.

According to the present invention, there is also provided a method of manufacturing a film-encased electric device having an electric device element surrounded by encasing films having at least respective heat-sealable resin layers and having respective outer peripheral regions thermally fused to each other to provide a heat-sealed area, the encasing films having an inner space therebetween serving as an electric device element housing which accommodates the electric device element sealed therein. The method comprises the steps of forming a cross-linked structure by a process of the cross-linking a heat sealable resin layer in at least one of the encasing films that face each other in a continuous region that includes a portion of the heat-sealed area of the encasing films, the cross-linked structure having a portion exposed to the electric device element housing and another portion held in contact with ambient air, sandwiching and surrounding the electric device element between the encasing films with the cross-linked structure formed therein, with the heat-sealable resin layers facing each other, and thermally fusing the outer peripheral regions of the encasing films which facing each other with the electric device element sandwiched therebetween to seal the electric device element.

In the method of manufacturing a film-encased electric device according to the present invention, before the encasing films are thermally fused, the cross-linked structure is formed in advance by cross-linking the heat-sealable resin layer in a given region of the encasing film. The electric device element is then surrounded by the encasing films with the cross-linked structure provided therein, and the outer peripheral regions of the encasing films that face each other are then thermally fused to each other, thereby providing the film-encased electric device according to the present invention.

The cross-linked structure may be formed by applying an electron beam to the heat-sealable resin layer. A peel-off force in the region where the cross-linked structure is provided can easily be controlled by the dose of an electron beam applied to form the cross-linked structure.

According to the present invention, the cross-linked structure is provided in a region of the heat-sealable resin layer, and the encasing films are thermally fused using the cross-linked structure. It is possible to easily and reliably configure a released pressure and a gas releasing position at the time that the encasing films are expended due to the generation of gas in the even to a failure.

Figure 1:
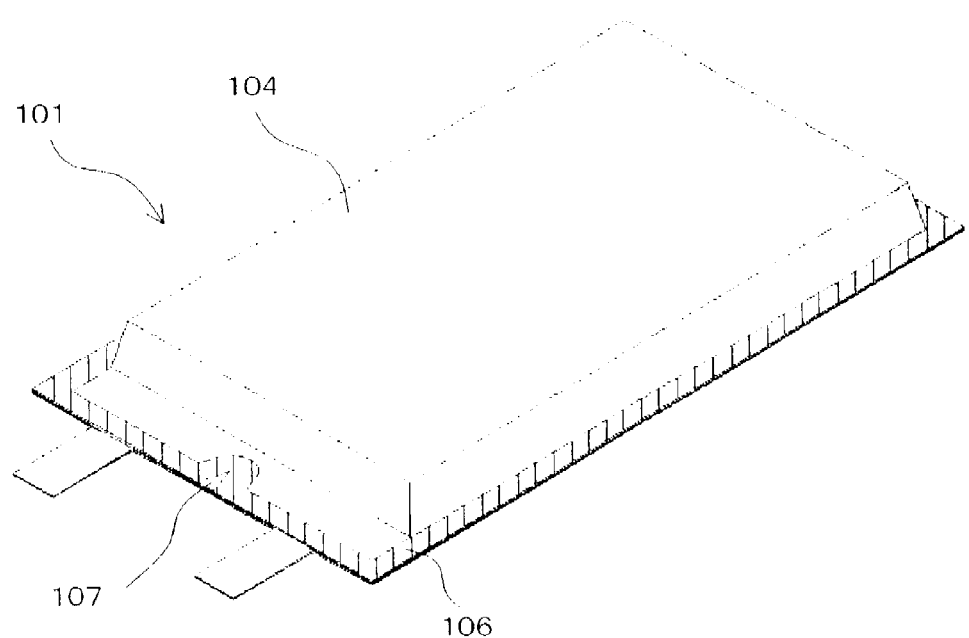
FIG. 1 is a perspective view of a conventional film-encased cell.
Figure 2:
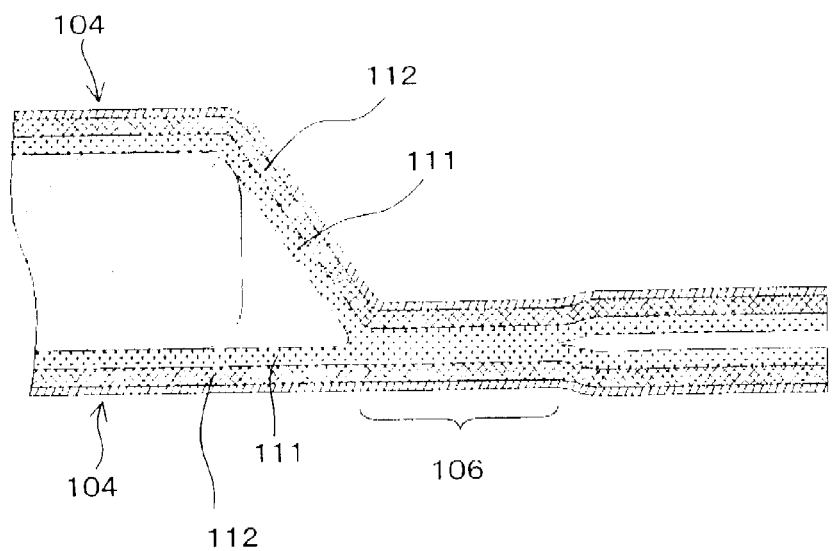
FIG. 2 is a cross-sectional view of a heat-sealed area of the film-encased cell shown in FIG. 1.
Figure 3:
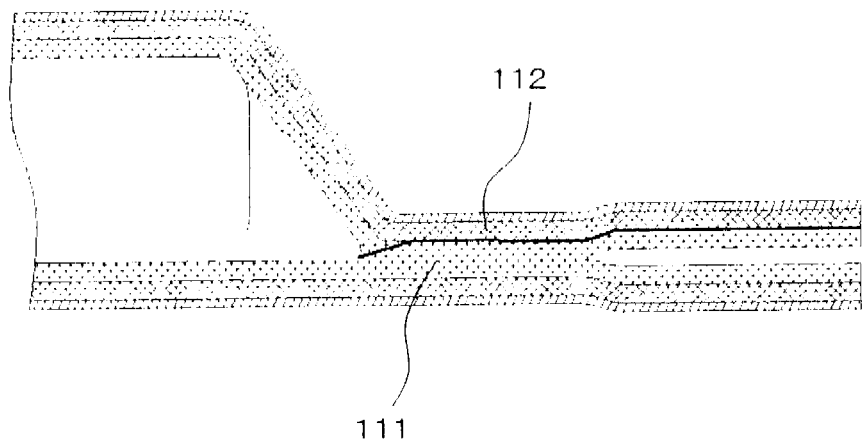
FIG. 3 is a cross-sectional view of the heat-sealed area of the film-encased cell shown in FIG. 1, illustrating an example in which the peeling of encasing films progresses.
Figure 4:
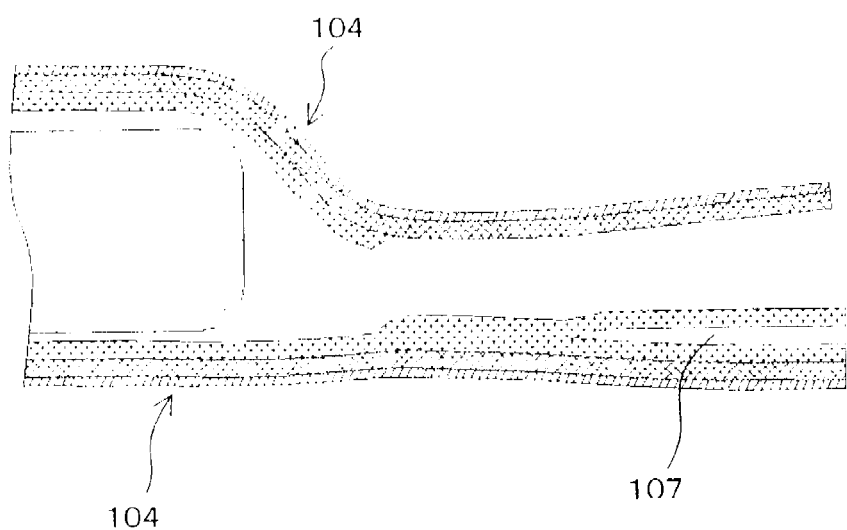
FIG. 4 is a cross-sectional view of the heat-sealed area of the film-encased cell shown in FIG. 1, illustrating the manner in which the peeling of the encasing films progresses along an interface between a heat-sealable resin layer and a metal layer.

DESCRIPTION OF REFERENCE CHARACTERS 1, 21, 31, 41, 51, 61 film-encased cell
2, 32, 72 cell element
3a, 23a positive pole tab
3b, 23b negative pole tab
4, 5, 24, 34, 44, 54, 64, 74, 75 encasing film
4a cup portion
6, 26, 36, 46, 76 heat-sealed area
6a, 26a, 36a projecting heat-sealed area
7, 27, 37, 67, 77 gas releaser
8, 28, 38, 48, 58, 68 cross-linked structure
11 heat-sealable resin layer
12 air-impermeable layer
13 protective layer
24a unsealed area
36, 69 tube
78 resin sheet

BEST MODE FOR CARRYING OUT THE INVENTION

Figure 5:
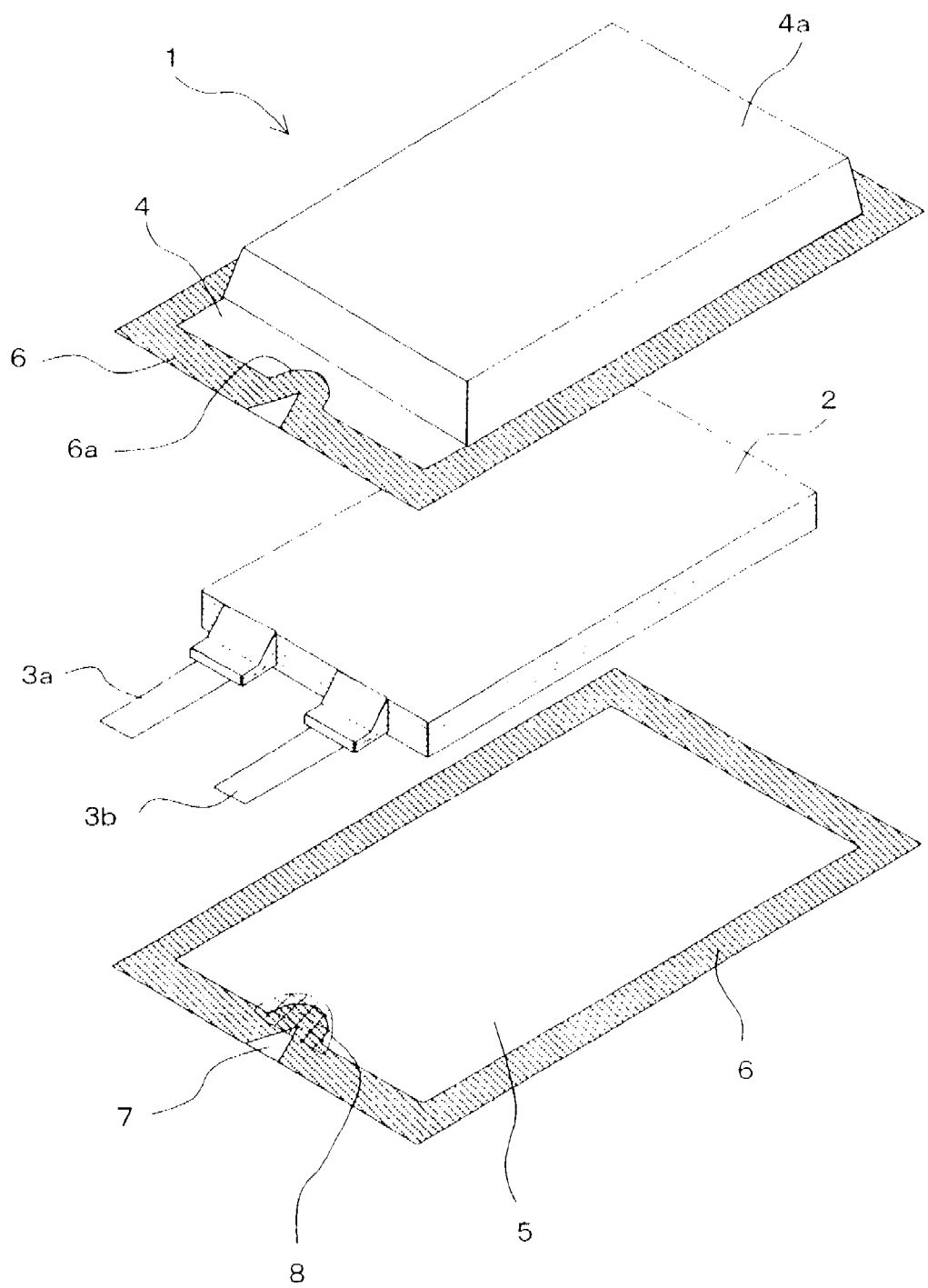
FIG. 5 is an exploded perspective view of a film-encased cell according to a first embodiment of the present invention.

FIG. 5 shows film-encased cell 1 according to a first embodiment of the present invention. Film-encased cell 1 has cell element 2 substantially in the form of a flat rectangular parallelepiped having a laminated assembly of positive poles and negative poles, positive pole tab 3a and negative pole tab 3b which are connected respectively to the positive poles and the negative poles of cell element 2, and two encasing films 4, 5 and sealing cell element 2.

Cell element 2 is of a structure wherein the positive poles and the negative poles, each comprising a metal foil having surfaces that are opposite each other and that are coated with an electrode material, are alternately laminated with separators interposed therebetween. Uncoated portions which are not coated with the electrode material project from respective sides of the positive poles and the negative poles. The uncoated portions of the positive poles are ultrasonically welded together and connected to positive pole tab 3a, and the uncoated portions of the negative poles are ultrasonically welded together and connected to negative pole tab 3b. The ultrasonically welded uncoated portions of the positive and negative poles are called current collectors. Therefore, positive pole tab 3a and negative pole tab 3b are connected to the current collectors of cell element 2.

Figure 6:
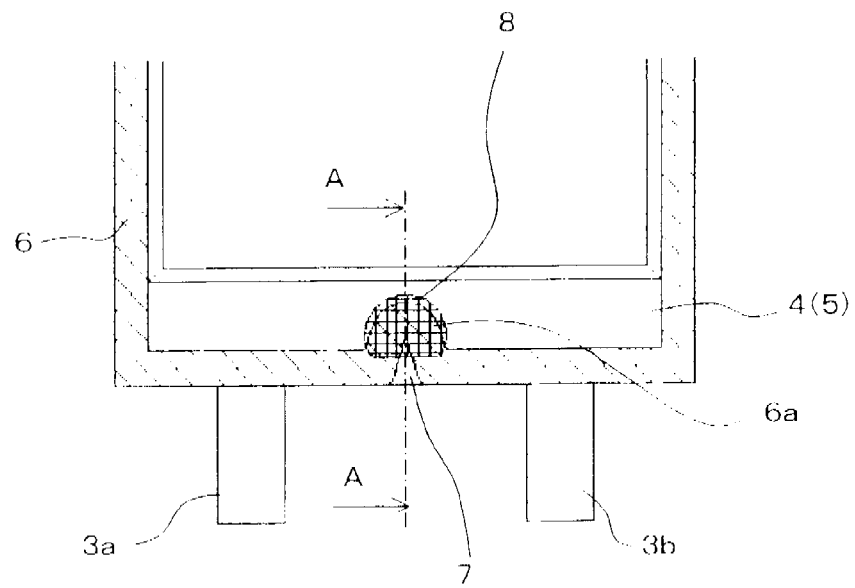
FIG. 6 is a partial plan view of a region around a pressure releasing structure of the film-encased cell shown in FIG. 5.

The positive poles and the negative poles of cell element 2 are stacked with the uncoated portions of the electrode material being oriented in the same direction. Therefore, positive pole tab 3a and negative pole tab 3b are connected to one side of cell element 2. Positive pole tab 3a and negative pole tab 3b serve as electrodes for electric connection to an external circuit. As shown in FIG. 6, positive pole tab 3a and negative pole tab 3b have distal end portions extending out of encasing films 4, 5. In the present embodiment, film-encased cell 1 has a substantially elongate rectangular planar shape with positive pole tab 3a and negative pole tab 3b extending from a shorter side of the elongated rectangular shape.

If film-encased cell 1 is a nonaqueous electrolyte cell such as a lithium ion cell, then an aluminum foil is used as the metal foil of the positive poles and a copper foil is used as the metal foil of the negative poles. Positive pole tab 3a comprises an aluminum plate, and negative pole tab 3b comprises a nickel plate or a copper plate. If negative pole tab 3b comprises a copper plate, then its surface may be plated with nickel.

The separators may be sheet-like members that can be impregnated with an electrolytic solution, such as microporous films, nonwoven fabric, or woven fabric, made of thermoplastic resin such as polyolefin or the like.

Since encasing films 4, 5 sandwich and enclose cell element 2 on respective opposite sides in the thickness direction thereof, encasing films 4, 5 have planar dimensions greater than the planar dimensions of cell element 2. Encasing films 4, 5 have their superposed facing surfaces thermally fused to each other around cell element 2, thereby sealing cell element 2. Consequently, the entire outer peripheral edge of cell element 2 is sealed into a heat-sealed region which is shown hatched as heat-sealed area 6 in FIG. 6. One of the encasing films 4 has a cup portion 4a to create a cell element housing which is a space for surrounding cell element 2. Heat-sealed area 6 is formed fully around cup portion 4a. Cup portion 4a may be formed by deep-drawing encasing film 4. In the present embodiment, cup portion 4a is formed only in encasing film 4. However, cup portions may be formed in both encasing films 4, 5. Alternatively, no cup portions may be formed, and cell element 2 may be surrounded by encasing films 4, 5 under their flexibility.

Figure 7:
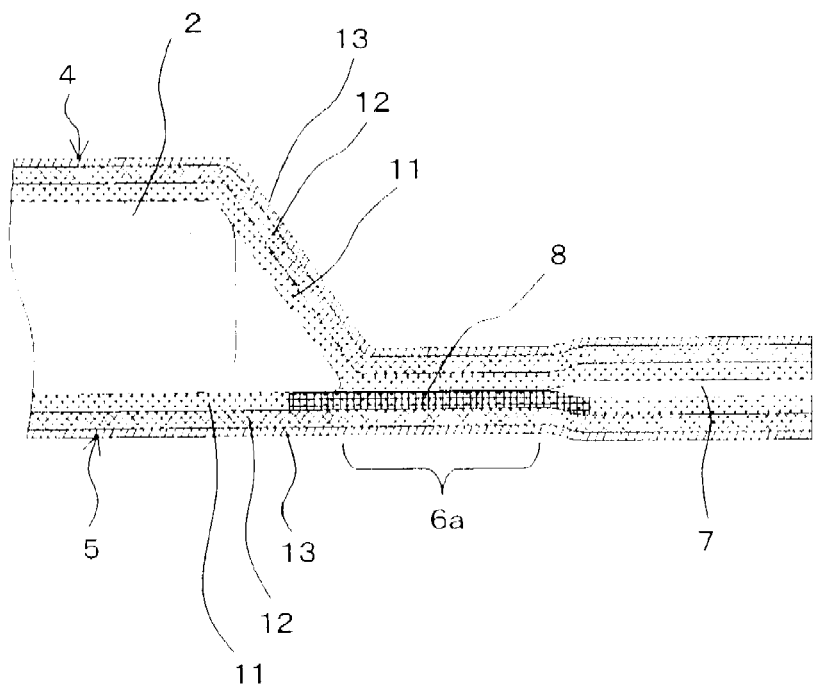
FIG. 7 is a cross-sectional view taken along line A-A of FIG. 6.

Each of encasing films 4, 5 comprises a laminated film. The laminated film of each of encasing films 4, 5 comprises a film which is flexible and is capable of heat-sealing cell element 2 so that the electrolytic solution will not leak out of cell element 2. Typically, as shown in FIG. 7, the laminated film comprises a laminated assembly of heat-sealable resin layer 11 made of heat-sealable resin, air-impermeable layer 12 such as a thin film of metal, and protective layer 13 made of a film of polyester such as polyethylene terephthalate or nylon, the layers being successively stacked in the order named. Each of encasing films 4, 5 may have at least heat-sealable resin layer 11 and air-impermeable 12, with protective layer 13 being added if necessary. To seal cell element 2, heat-sealable resin layers 11 are disposed so as to face each other, and to surround cell element 2.

The thin film of metal of air-impermeable layer 12 may comprise a film of Al, Ti, Ti alloy, Fe, stainless steel, or Mg alloy having a thickness ranging from 10 to 100 μm. The heat-sealable resin of heat-sealable resin layer 11 will be described later. For thermally fusing heat-sealable resin layers 11 sufficiently, each of heat-sealable resin layers 11 should preferably have a thickness ranging from 10 to 200 μm and more preferably from 30 to 100 μm.

The sealed region has a pressure releasing structure. In the present embodiment, the pressure releasing structure is positioned between positive pole tab 3a and negative pole tab 3b. The pressure releasing structure has projecting heat-sealed portion 6a comprising a portion of the inner edge of heat-sealed area 6 which projects toward cell element 2 and gas releaser 7 extending from the outer edges of encasing films 4, 5 toward projecting heat-sealed portion 6a and having a distal end reaching heat-sealed portion 6a. Gas releaser 7 is formed as a region between encasing films 4, 5 wherein encasing films 4, 5 are not thermally fused but simply face each other. Gas releaser 7 is thus held vented to the ambient air. Gas releaser 7 is disposed in a position spaced away from the cell element housing, and hence is not held in contact with the cell element housing.

Lower encasing film 5, i.e., encasing film 5 which has no cup portion formed therein, has cross-linked structure 8 formed in a portion of heat-sealable resin layer 11 by a cross-linking process. Cross-linked structure 8 is disposed in a region including at least heat-sealed portion 6a. Therefore, cross-linked structure 8 is a single continuous region having a portion exposed to the cell element housing and another portion exposed to gas releaser 7. Since cross-linked structure 8 is disposed in the region including heat-sealed portion 6a, heat-sealable resin layer 11 of upper encasing film 4 is thermally fused to cross-linked structure 8 of lower encasing film 5 in heat-sealed portion 6a.

In real film-encased cell 1, cross-linked structure 8 cannot be viewed from outside of film-encased cell 1. In FIG. 6, however, cross-linked structure 8 is illustrated as being representative of its position. The same applies in plan views of film-encased cells according to other embodiments.

Cross-linked structure 8 can be formed when an electron beam is applied to heat-sealable resin layer 11. A heat-sealable resin may be cross-linked by adding a cross-linking agent to the resin. However, cross-linked structure 8 can easily be formed selectively in only a certain position by an electron beam, using a mask to block the electron beam.

In as much as cross-linked structure 8 can be formed by applying an electron beam to heat-sealable resin layer 11, the heat-sealable resin of heat-sealable resin layer 11 may comprise a resin composition which can thermally be fused and can produce cross-linked structure 8 when it is irradiated with an electron beam. The resin composition may be a single resin, a mixture of plural types of resins, or an electron-beam-degradable resin composition with an electron-beam-reactive compound added (mixed or coated, etc., also applicable below).

The resin composition may be a polyolefin homopolymer such as polyethylene (high-, medium-, and low-density polyethylene or straight-chain low-density polyethylene), a polyolefin copolymer such as a propylene-ethylene copolymer, a copolymer of propylene and/or ethylene and α-olefin such as butene-1, or the like, or a resin such as modified polyolefin having repetitive units represented by —(CH$_2$—CHX)— (X represents a substituent group such as H, CH$_3$, or the like) such as an ethylene-vinyl acetate copolymer (EVA), an ethylene-ethyl acrylate copolymer (EEA), an ethylene-methyl acrylate copolymer (EMA), anethylene-glycidyl methacrylate copolymer (EGMA), or the like.

An electron-beam-degradable such as polyisobutylene, polymethacrylate, polyvinylidene fluoride, or the like can also be used as the resin of heat-sealable resin layer 11 if an electron-beam-reactive compound referred to below is added thereto.

The electron-beam-reactive compound is not limited to particular compounds insofar as it reacts upon exposure to an electron beam, but should preferably be a polyfunctional compound which is capable of forming a cross-linked structure. For example, the electron-beam-reactive compound may be a polyfunctional acrylic compound such as triethylene glycol di(metha)acrylate, trimethyl propane tri(metha)acrylate, pentaerythritol tetracrylate, dipentaerythritol hexacrylate, pentaerythritol acrylate hexamethylene diisocianate, urethane polymer, or the like, a monofunctional acrylic compound such as methyl(metha) acrylate, methoxypolyethylene glycol(metha)acrylate, or the like, a mixture of a polyfunctional acrylic compound and a monofunctional acrylic compound, an alicyclic epoxy compound such as 3,4-epoxycyclohexylmethyl-3',4'-epoxycyclohexane carboxylate, 1,4-(6-methyl-3,4-epoxycyclohexylmethyl carboxylate)butane or the like, or a vinyl compound such as vinylpyrrolidone, vinyl acetate, vinylpyridine, styrene, or the like. These electron-beam-reactive compounds may be mixed in the heat-sealable resin layer in its entirety or may be applied to the surface of the heat-sealable resin layer.

The electron beam is applied to heat-sealable resin layer 11 before the step of sealing cell element 2, or specifically before cell element 2 is surrounded by encasing films 4, 5 while the region of encasing film 5 wherein cross-linked structure 8 will not be formed is being masked by an electron beam blocking member. The electron beam blocking member may be made of any material insofar as they can block an electron beam from being applied to the region wherein cross-linked structure 8 will not be formed. For example, the electron beam blocking member may be made of a metal material such as aluminum, iron, lead, titanium, copper, or the like, or a glass material. Of these materials, a metal material such as aluminum, iron, or the like is preferable because it can easily be machined or formed to a desired shape.

A method of manufacturing film-encased cell 1 according to the present embodiment will be described below.

A predetermined region of one of two encasing films 4, 5 is irradiated with an electron beam to form cross-linked structure 8.

Then, cell element 2 with positive pole tab 3a and negative pole tab 3b, which has been prepared in advance, is sandwiched and surrounded by encasing films 4, 5. At this time, encasing films 4, 5 are oriented such that heat-sealable resin layers 11 face each other. Thereafter, the regions of encasing films 4, 5 which face each other around cell element 2 are pressed and heated into heat-sealed area 6 by a heat-sealing head (not shown), thereby sealing cell element 2. If a heat-sealing head having a pressing surface complementary in shape to heat-sealed area 6 is used, then special steps for forming projecting sealed portion 6a and gas releaser 7 are not required. Encasing films 4, 5 and the heat-sealing head are positioned relative to each other such that the position where the projecting sealed portion 6a will be aligned with the position of cross-linked structure 8 of encasing film 5.

Cell element 2 can be sealed, for example, by thermally fusing three sides of encasing films 4, 5 together or by thermally fusing one at a time to produce a bag with one side open, introducing an electrolytic solution into the bag through the open side of encasing films 4, 5, and thereafter thermally fusing the remaining open side. If the remaining one side is thermally fused in a depressurized atmosphere (depressurized chamber), then when sealed film-encased cell 1 is placed back in the atmospheric pressure environment, encasing films 4, 5 are pressed against cell element 2 under atmospheric pressure and hence are held in intimate contact with cell element 2.

While film-encased cell 1, thus constructed, is in use, if a gas is generated from cell element 2 due to the application of a voltage outside of a standard range or due to a temporarily high temperature, then an internal pressure buildup is developed in film-encased cell 1. The internal pressure buildup causes the cell element housing, which is a space for surrounding cell element 2 in encasing films 4, 5, to be expanded into a dome shape, peel-off stress is placed on the inner edge of heat-sealed area 6.

Since heat-sealed area 6 includes projecting sealed portion 6a as described above, the peel-off stress concentrates on projecting sealed portion 6a, and the peeling of encasing films 4, 5 progresses preferentially in projecting sealed portion 6a. As clearly shown in FIG. 7, projecting sealed portion 6a is a region where cross-linked structure 8 of encasing film 5 and heat-sealable resin layer 11 of encasing film 4 are thermally fused to each other. Cross-linked structure 8 is less liable to soften at high temperatures than heat-sealable resin layer 11. When cross-linked structure 8 and heat-sealable resin layer 11 are thermally fused to each other, cross-linked structure 8 and heat-sealable resin layer 11 are not fully integrated with each other, but a boundary remains present between cross-linked structure 8 and heat-sealable resin layer 11. The expression "less liable to soften at high temperatures" means that a temperature vs. strain characteristic, i.e., a so-called creep curve, plotted when the temperature of a resin is increased while the resin is pressurized under a constant stress, has a small gradient if the horizontal axis represents the temperature.

Figure 8:
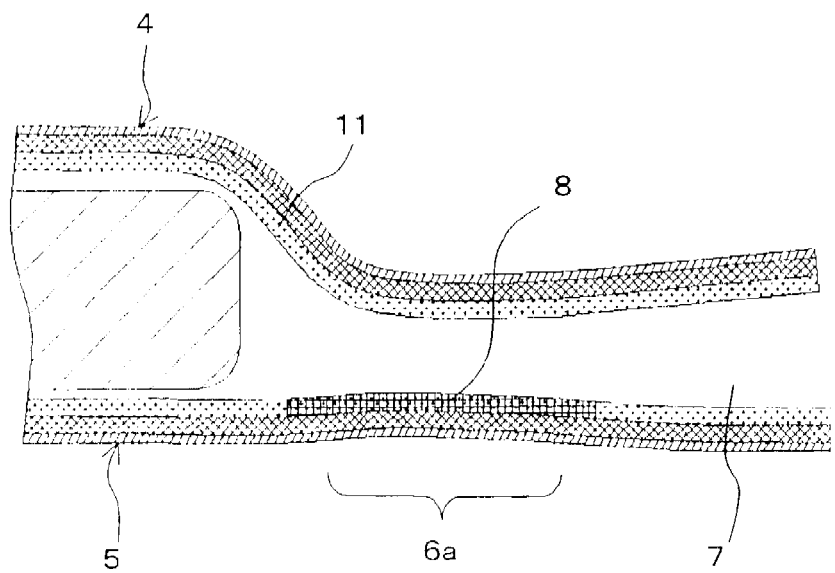
FIG. 8 is a view showing the manner in which encasing films have peeled off in a projecting heat-sealed area shown in FIG. 7.

Because cross-linked structure 8 and heat-sealable resin layer 11 are thermally fused to each other in projecting sealed portion 6a, the peeling of encasing films 4, 5 progresses along the boundary between cross-linked structure 8 of encasing film 5 and heat-sealable resin layer 11 of encasing film 4. As the peeling progresses, as shown in FIG. 8, encasing films 4, 5 separate from each other along the boundary in projecting sealed portion 6a between heat-sealable resin layer 11, which is not cross-linked, of encasing film 4 and cross-linked structure 8 of encasing film 5, bringing the cell element housing and gas releaser 7 into contact with each other. When the cell element housing and gas releaser 7 make contact with each other, gas in the cell element housing is discharged from film-encased cell 1 through gas releaser 7, thereby releasing the pressure in the cell element housing. As cross-linked structure 8 defines the peel-off interface between encasing films 4, 5, film-encased cell 1 allows the gas to be reliably released under a stable pressure through gas releaser 7 and this process is highly reliable.

The principles on which cross-linked structure 8, provided in one of encasing films 4, 5, permits encasing films 4, 5 to peel off along the interface therebetween, will be described below.

If a resin layer which is cross-linked (hereinafter referred to as "cross-linked resin layer") and a resin layer which is not cross-linked (hereinafter referred to as "non-cross-linked resin layer") are thermally fused to each other, then the following phenomenon occurs in the fused interface between the cross-linked resin layer and the non-cross-linked resin layer. In the cross-linked resin layer, cross-linked polymer chains do not flow. Therefore, the cross-linked polymer chains are not liable to be fused and integrated with polymer chains in the non-cross-linked resin layer. However, depending on the degree of cross-linking in the cross-linked resin layer, polymer chains which are not cross-linked are present in interstices of or within the matrix of cross-linked polymer chains. In a small region where such non-cross-linked, free polymer chains are gathered, the polymer chains can be fused and flow at a temperature higher than the melting point.

If such a small region is held in contact with the fused interface between the cross-linked resin layer and the non-cross-linked resin layer, then when the cross-linked resin layer and the non-cross-linked resin layer which are held in contact with each other are heated to a temperature higher than the melting point, polymer chains flow into the resin layers across the fused interface. When the heated resin layers are cooled and solidified, an agglomerated or crystalline body comprising a mixture of non-cross-linked polymer chains in the cross-linked resin layer and polymer chains in the cross-linked resin layer is formed in a continuously integrated fashion between the resin layers across the fused interface.

When the cross-linked resin layer and the non-cross-linked resin layer are thermally fused to each other, as described above, the non-cross-linked polymer chains in the cross-linked resin layer contribute to the fusion between the resin layers, and the cross-linked polymer chains in the cross-linked resin layer are not continuously integrated with the non-cross-linked resin layer. Such a region, which is not continuously integrated, is present in the fused interface between the resin layers. Therefore, when peel-off stress acts on the resin layers, the peeling progresses along the fused interface between the resin layers, i.e., the interface between encasing films 4, 5.

If the degree of cross-linking of the cross-linked resin layer is changed, then the proportion of the small region where non-cross-linked, free polymer chains are gathered, is changed. As a result, when the cross-linked resin layer and the non-cross-linked resin layer are thermally fused, the proportion of the agglomerated or crystalline body which is continuously integrated between the resin layers across the fused interface is changed. Specifically, if the degree of cross-linking of the cross-linked resin layer is lowered, then the proportion of the small region is increased, and the proportion of the agglomerated or crystalline body which is continuously integrated between the resin layers is increased. Since the proportion of the agglomerated or crystalline body which is continuously integrated between the resin layers is higher, the fusion strength of the resin layer is higher. Since the degree of cross-linking of the cross-linked resin layer can be controlled by changing the dose of the electron beam, the fusion strength of the resin layers can be freely controlled by controlling the dose of the electron beam.

To put it another way, the fusion strength means the peel-off strength. Since the fusion strength is higher, the fused layers are more difficult to peel off, and hence the peel-off strength is greater. The inventor conducted a peel-off test, as described below, in order to check the difference between peel-off strengths when a cross-linked structure layer was present and a cross-linked structure layer was not present.

First, a cross-linked structure layer was formed in one of the encasing films that faces another, and, while the cross-linked structure layer and a non-cross-linked structure layer were facing each other, portions, 10 mm wide, of the encasing films were thermally fused to each other. For comparison, encasing films free of a cross-linked structure layer were employed, and portions, 10 mm wide, of the encasing films were thermally fused to each other. Then, the thermally fused portions of the encasing films, including portions not thermally fused, were cut out to identical lengths in a direction perpendicular to the transverse direction of the thermally fused portions, producing inventive samples (Sinv-1, Sinv-2) and comparative samples (Scom-1, Scom-2).

Figure 9:
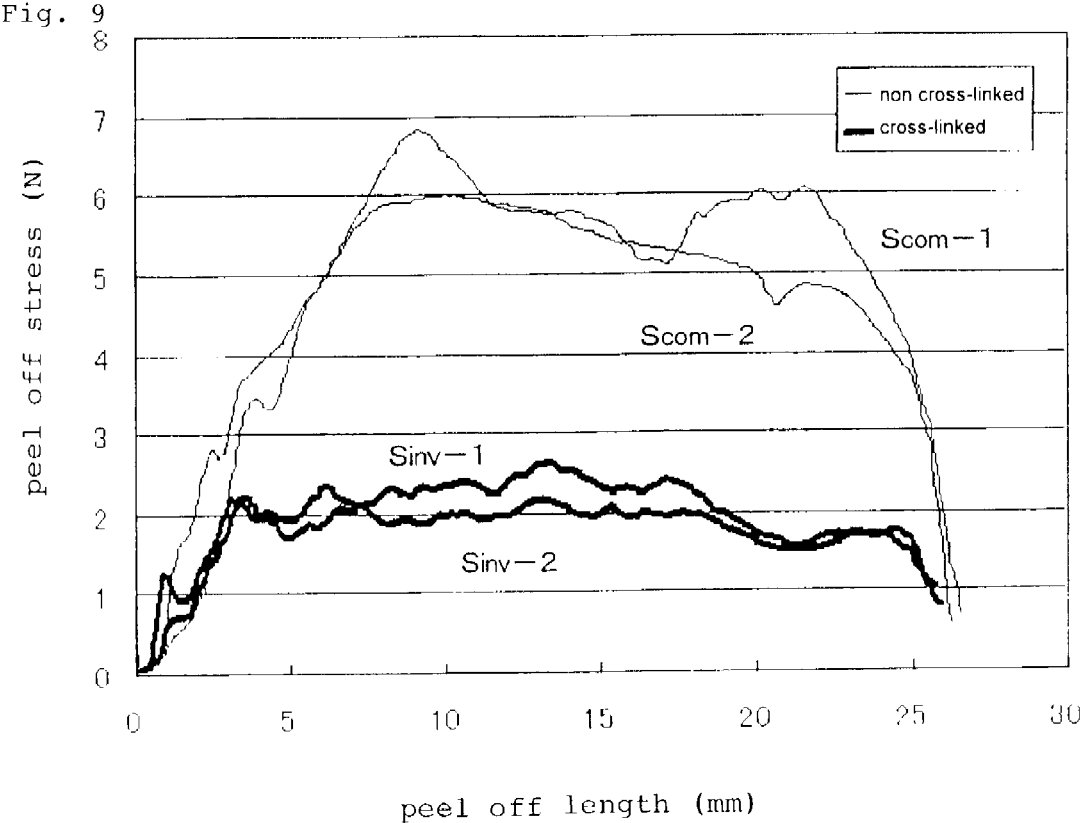
FIG. 9 is a graph showing experimental results for comparing peel-off strengths of encasing films that are cross-linked and that are not cross-linked.

The two inventive samples and the two comparative samples were thus prepared. The portions not thermally fused were clamped, and the thermally fused portions were peeled off in a direction 180 degrees apart. Forces acting when the thermally fused portions were peeled off were measured. The measured results are shown in FIG. 9. In FIG. 9, the horizontal axis represents the peel-off length which means the distance between the chucks. The peel-off length actually includes an elongation of the encasing film. The distance between the chucks at the time the thermally fused portion was completely peeled off is of about 25 mm. As can be seen from FIG. 9, Sinv-1, Sinv-2 were peeled off generally by smaller forces than Scom-1, Scom-2. In other words, the cross-linked structure layer present in the interface between the encasing films that face each other is effective to reduce the peel-off strength.

The released pressure of the gas in the present embodiment depends on the peel-off strength of encasing films 4, 5 in projecting sealed portion 6a. As described above, the fusion strength depends on the dose of the electron beam applied to form cross-linked structure 8. Because the dose of the electron beam is higher, the degree of cross-linking of heat-sealable resin layer 11 which is irradiated with the electron beam is higher, tends to reduce the peel-off strength of encasing films 4, 5 in projecting fused portion 6a. Since the peel-off strength is lower, the gas can be released under a lower pressure. Therefore, the released pressure can be set to a desired level by appropriately adjusting the degree of cross-linking of heat-sealable resin layer 11.

The released pressure which is preferable in designing film-encased cell 1, expressed in terms of an increase above the atmospheric pressure, ranges from 0.05 MPa to 1 MPa and more preferably from 0.1 MPa to 0.2 MPa. If the released pressure is lower than 0.05 MPa, then the gas tends to be released even in the event of a small problem such as when a large current temporarily flows through the cell or the cell is temporarily heated to a high temperature, with the result that film-encased cell 1 will not operate properly. Conversely, if the released pressure is higher than 1 MPa, then the gas tends to be released through another region before the peeling progresses to gas releaser 7, and the gas may possibly be ejected in an unexpected direction.

Figure 10:
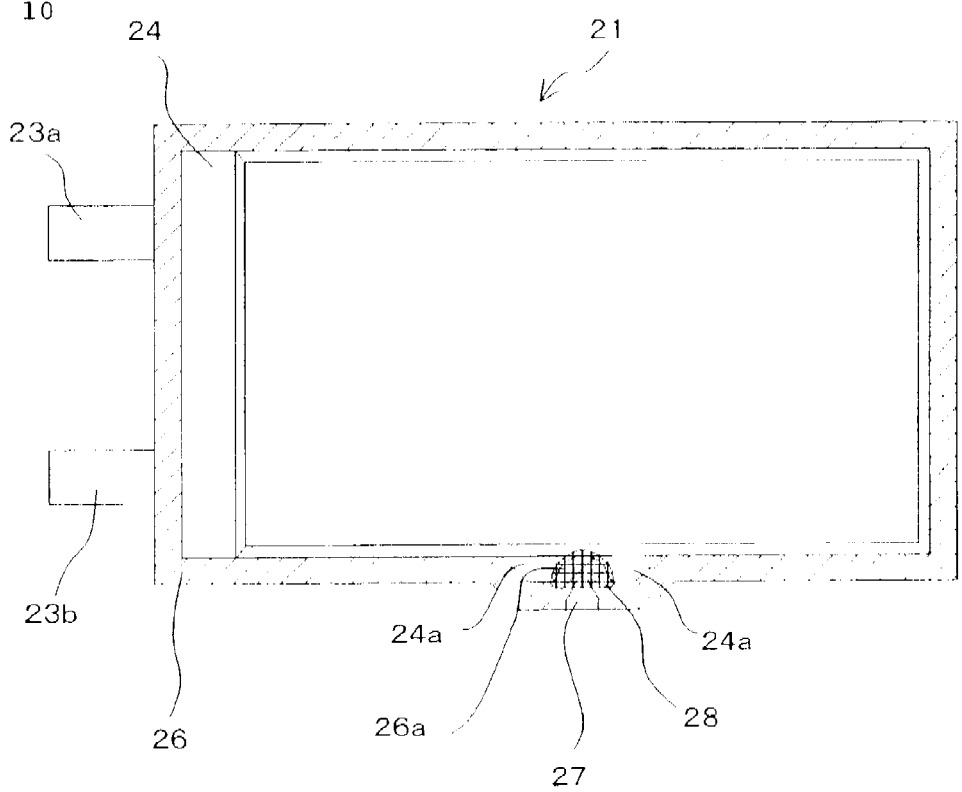
FIG. 10 is a plan view of a film-encased cell according to a second embodiment of the present invention.

In the above embodiment, the single pressure releasing structure is disposed on a shorter side of film-encased cell 1, particularly a side thereof from which positive pole tab 3a and negative pole tab 3b extend. However, the number of pressure releasing structures and the positions where they are located may be changed depending on the purpose for which film-encased cell 1 is used and the conditions in which film-encased cell 1 is used. FIG. 10 shows one example of such a modification as a second embodiment of the present invention.

Film-encased cell 21 shown in FIG. 10 has a pressure releasing structure on a longer side thereof. In the present embodiment, positive pole tab 23a and negative pole tab 23b extend from a shorter side of film-encased cell 21. Therefore, the pressure releasing structure is disposed on a side different from the side from which positive pole tab 23a and negative pole tab 23b extend. A cell element (not shown) is sandwiched and surrounded by two encasing films 24 on both sides thereof in the thickness direction. The cell element is sealed by encasing films 24 whose entire peripheral edges are thermally fused, with positive pole tab 23a and negative pole tab 23b extending therefrom. The structural details of the cell element and the layer details of encasing films 24 are the same as those of the first embodiment, and will not be described below.

The pressure releasing structure has projecting sealed portion 26a comprising a portion of the inner edge of heat-sealed area 26 that is formed by thermally fusing encasing films 24 and projects toward the cell element, and gas releaser 27 extending from the outer edges of encasing films 24 toward projecting heat-sealed portion 26a and having a distal end reaching heat-sealed portion 26a. Gas releaser 27 is formed as a region wherein encasing films 24 are not thermally fused but simply face each other. Gas releaser 27 held is vented to the ambient air.

If the pressure releasing structure is disposed on the side from which positive pole tab 23a and negative pole tab 23b extend, then since space for a current collector is required between the cell element and heat-sealed area 26 on the side from which positive pole tab 23a and negative pole tab 23b extend, the projecting sealing portion may be provided in heat-sealed area 26 without the need for changing the outer profile dimensions of film-encased cell 21. However, if the pressure releasing structure is disposed on a side from which positive pole tab 23a and negative pole tab 23b do not extend, then there is no such space between the cell element and heat-sealed area 26 on such a side. If projecting sealing portion 26a is simply added to heat-sealed area 26, then the outer profile dimensions of film-encased cell 21 will be increased.

According to the present embodiment, encasing films 24 are of a shape including an outwardly projecting portion, and heat-sealed area 26 is formed such that a bay-shaped region communicating with the cell element housing is provided on the outwardly projecting portion, with projecting sealed portion 26a formed in the bay-shaped region. Opposite sides of projecting sealed portion 26a are formed as unsealed portions 24a where encasing films 24 are not thermally fused. Since the bay-shaped region that is in contact with the cell element housing is provided and projecting sealed portion 26a is formed in the bay-shaped region, any increase in the outer profile dimensions of film-encased cell 21 is held to a minimum, and projecting sealed portion 26a which has a function as a stress concentration area can be provided.

In the present embodiment, one of two encasing films 24 has cross-linked structure 28 formed in the heat-sealable resin layer by the application of an electron beam.

Cross-linked structure 28 is disposed in the region including projecting sealed portion 26a and has a portion exposed to the cell element housing and gas releaser 27. Therefore, the peeling of encasing film 24 due to an internal pressure buildup in the cell element housing progresses along the boundary between cross-linked structure 28 and the heat-sealable resin layer of the other encasing film, as in the first embodiment. According to the present embodiment, consequently, film-encased cell 1 allows the gas to be reliably released under a stable pressure through gas releaser 7 and this process is highly reliable.

Figure 11:
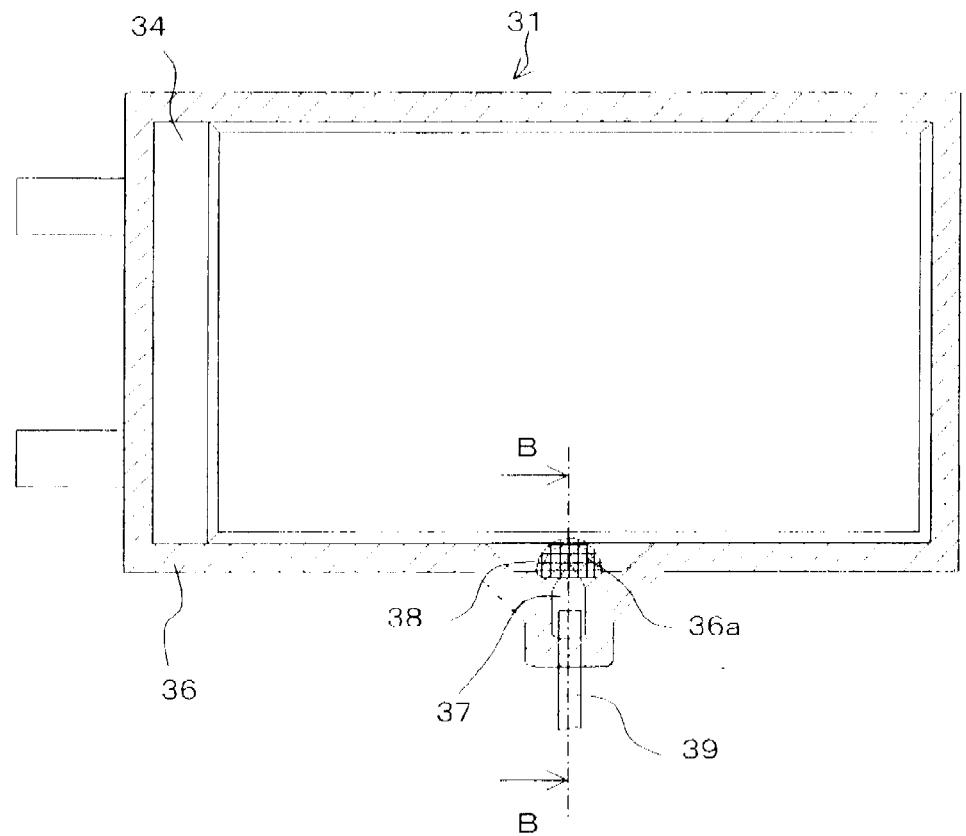
FIG. 11 is a plan view of a film-encased cell according to a third embodiment of the present invention.
Figure 12:
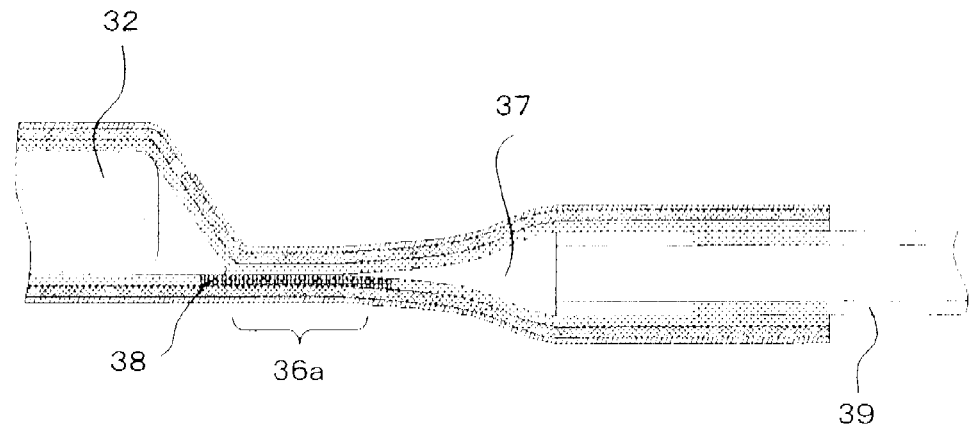
FIG. 12 is a cross-sectional view taken along line B-B of FIG. 11.

FIGS. 11 and 12 show a film-encased cell according to a third embodiment of the present invention.

Film-encased cell 31 according to the present embodiment differs from the second embodiment in that tube 39 is connected to gas releaser 27.

Film-encased cell 31 according to the present embodiment is identical to the second embodiment in that the pressure releasing structure that has projecting sealed portion 36a disposed as a stress concentration area in a portion of heat-sealed area 36, gas releaser 37 as a space wherein encasing films 34 are not thermally fused is disposed with its distal end in projecting sealed portion 36a, and cross-linked structure 38 is disposed in the heat-sealable resin layer of one of two encasing films 36 in the region including projecting sealed portion 36a.

Tube 39 has an end hermetically connected to gas releaser 37 and another open end extending to an appropriate position where a generated gas can be discharged from cell element 32 without adverse effects. Since the other end of tube 39 is open, gas releaser 37 is vented to the ambient air through tube 39. When gas is generated from cell element 32, the internal pressure in the cell element housing, which is a space accommodating cell element 32, increases therein, causing encasing films 34 to peel off in projecting sealed portion 36a. When encasing films 34 peel off, the gas is introduced from the cell element housing into gas releaser 37, passes through tube 39, and is discharged from the open end of tube 39.

The position where the gas is discharged can be selected as desired by connecting tube 39 to gas releaser 37. Since the position where the gas is discharged can be selected as desired by tube 39, the position of the pressure releasing structure can also be selected as desired. The present embodiment is particularly effective in the case where members and devices which are susceptible to gas are present around film-encased cell 31 and it is not preferable to discharge the gas directly from gas releaser 37. If the open end of tube 39 is placed in a position spaced away from film-encased cell 31, then the gas can be discharged at the position spaced away from film-encased cell 31. Tube 39 effectively functions only when the peel-off interface of encasing films 34 is defined and the cell element housing and gas releaser 37 are reliably brought into contact with each other.

Tube 39 should preferably be made of a flexible material. If tube 39 is made of a flexible material, then tube 39 can easily be arranged. After film-encased cell 31 is installed, the position where the gas is to be discharged can be freely changed. Tube 39 can be connected to gas releaser 37 by sandwiching the end of tube 39 between two encasing films 34 and bonding the outer edges of encasing films 34 to the outer circumferential surface of tube 39. Encasing films 34 and tube 39 may be bonded by any method insofar as tube 39 can be hermetically connected. Encasing films 34 and tube 39 may be bonded by an adhesive, or if tube 39 is made of thermoplastic resin, then encasing films 34 and tube 39 may be bonded by thermal fusion. In particular, if tube 39 is made of the same resin as the heat-sealable resin of the heat-sealable resin layers of encasing films 34, then tube 39 can be connected by thermal fusion. Tube 39 may be thermally fused as follows: Encasing films 34 are thermally fused, leaving a mouth for inserting tube 39 therein for forming gas releaser 37, and then the end of tube 39 is inserted through the mouth into gas releaser 37, after which tube 39 is thermally fused to encasing films 34. Alternatively, when cell element 32 is sealed, tube 39 is placed in a position sandwiched between encasing films 34, and tube 39 is connected at the same time that heat-sealed area 36 is formed in encasing films 34.

In the present embodiment, tube 39 is applied to the second embodiment. Tube 39 is also applicable to the second embodiment.

In each of the above embodiments, the stress concentration area for allowing peeling of the encasing films to progress preferentially is disposed in the heat-sealed area, and the cross-linked structure is provided in the stress concentration area. As described above, the cross-linked structure is less liable to soften at high temperatures than the other region, with the result that the region where the cross-linked structure is disposed has a smaller peel-off strength than the other region. Therefore, if a peel-off position can be sufficiently defined simply by providing the cross-linked structure, then no stress concentration area needs to be provided, and the cross-linked structure may be provided in a portion of the heat-sealed area. Some examples of such an alternative will be described below.

Figure 13:
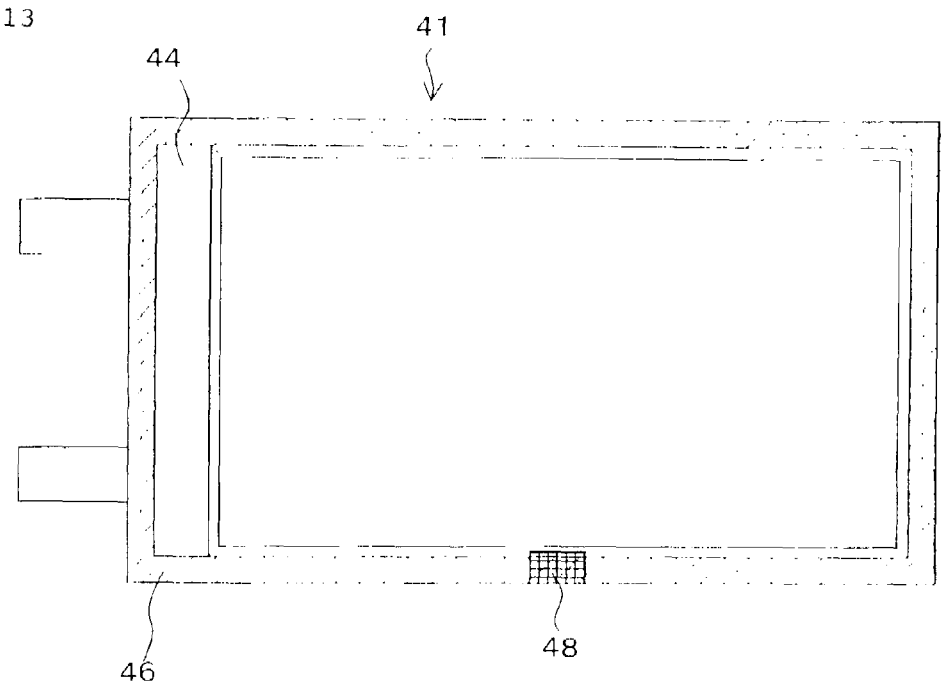
FIG. 13 is a plan view of a film-encased cell according to a fourth embodiment of the present invention.

FIG. 13 shows a film-encasing cell according to a fourth embodiment of the present invention. Film-encasing cell 41 according to the present embodiment employs elongate rectangular encasing films 44 having heat-sealed area 46 extending fully therearound and having a constant width, thereby sealing a cell element (not shown). Heat-sealed area 46 includes, in a portion thereof, cross-linked structure 48 disposed in a heat-sealable resin layer and having an inner edge exposed to a cell element housing which accommodates the cell element therein and an outer edge aligned with the outer edge of heat-sealed area 46. Cross-linked structure 48 thus has a portion that, other than the portion that is exposed to the cell element housing, vented to the ambient air.

Even though no stress concentration area is provided in heat-sealed area 46 according to the present embodiment, the region where cross-linked structure 48 is provided has a smaller peel-off strength than the other region of heat-sealed area 46. Therefore, the peeling of encasing films 44 due to internal pressure buildup in film-encased cell 41 progresses preferentially in the region where cross-linked structure 48 is provided. When the peeling reaches the outer edge of cross-linked structure 48, the cell element housing comes into contact with the ambient air, discharges the gas from the outer edge of the region where cross-linked structure 48 is provided and thereby releases the pressure.

Figure 14:
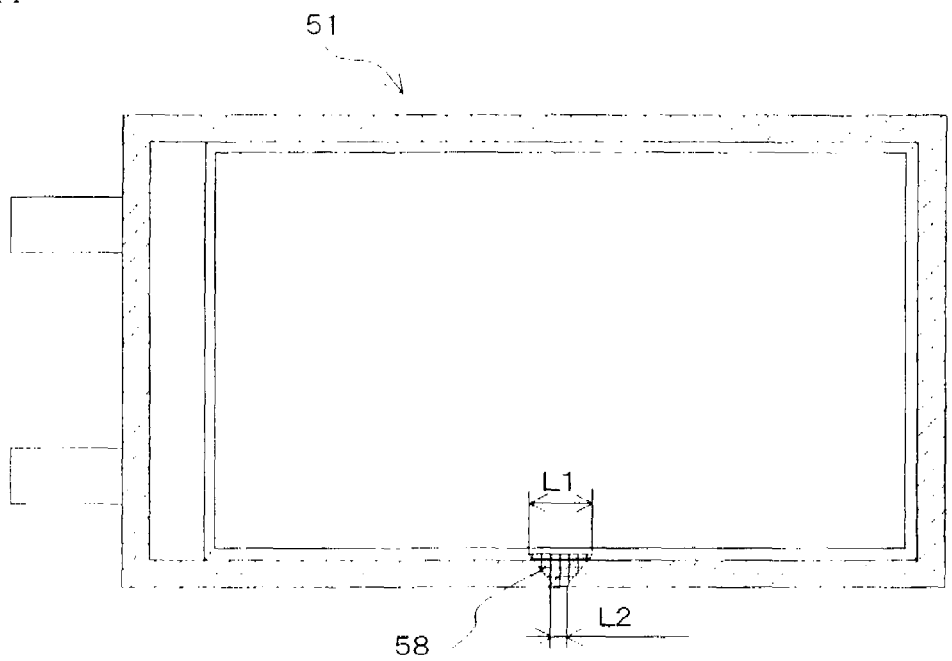
FIG. 14 is a plan view of a modification of the film-encased cell shown in FIG. 13.

The shape and size of cross-linked structure 48 are not limited insofar as cross-linked structure 48 has a portion exposed to the cell element housing and another portion which is not exposed to the cell element housing and which is vented to the ambient air. In FIG. 13, cross-linked structure 48 has an elongate rectangular shape. FIG. 14 shows film-encased cell 51 having cross-linked structure 58 which is of a trapezoidal shape. In FIG. 14, cross-linked structure 58 has an inner edge whose length L1 is greater than length L2 of its outer edge, so that cross-linked structure 58 has dimensions progressively smaller outwardly from its edge near the cell element housing. Cross-linked structure 58 thus shaped matches the way in which encasing films 54 peel off progressively, and hence allows encasing films 54 to peel off smoothly.

Figure 15:
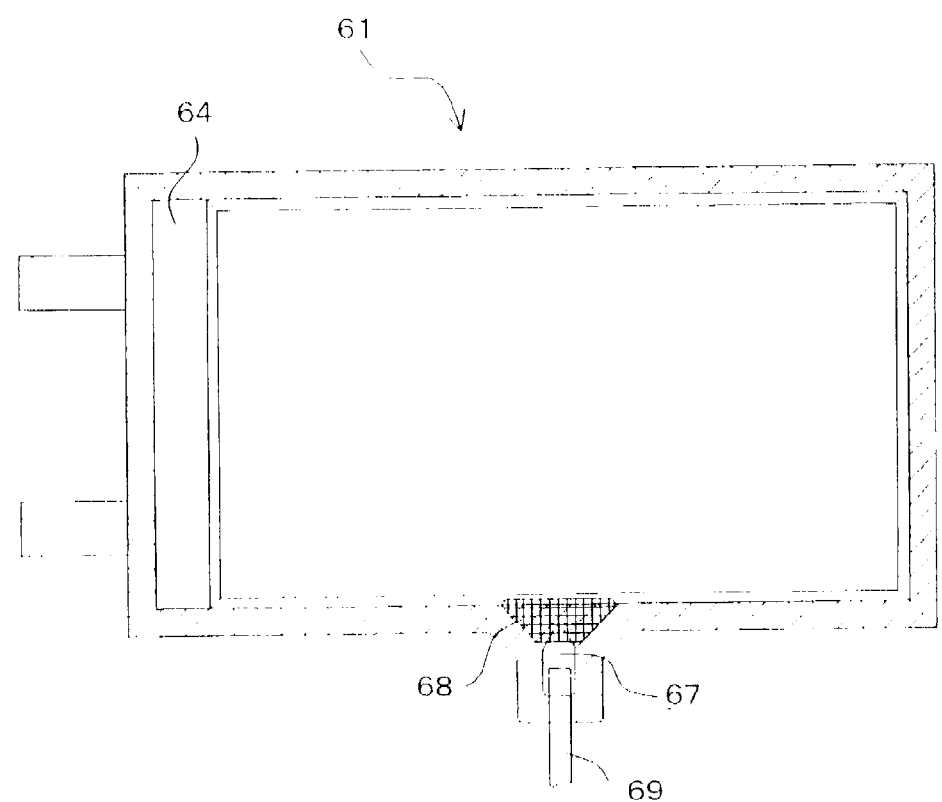
FIG. 15 is a plan view of another modification of the film-encased cell shown in FIG. 13.

FIG. 15 shows another example of a pressure releasing structure free of a stress concentration area. Film-encased cell 61 shown in FIG. 15 employs tube 69 according to the third embodiment as applied to the example shown in FIG. 14. Encasing films 64 have gas releaser 67 formed by not thermally fusing encasing films 64, and gas releaser 47 has a distal end disposed in a region where cross-linked structure 68 is provided. Tube 69 is hermetically connected to gas releaser 67. When cross-linked structure 68 vents to the ambient air through gas releaser 67 and tube 69, the gas can be discharged under a stable pressure from a particular position. If the gas can be discharged from the outer edges of encasing films 64, then tube 69 may be dispensed with and gas releaser 67 may be directly vented to the ambient air, as in the first embodiment.

Figure 16:
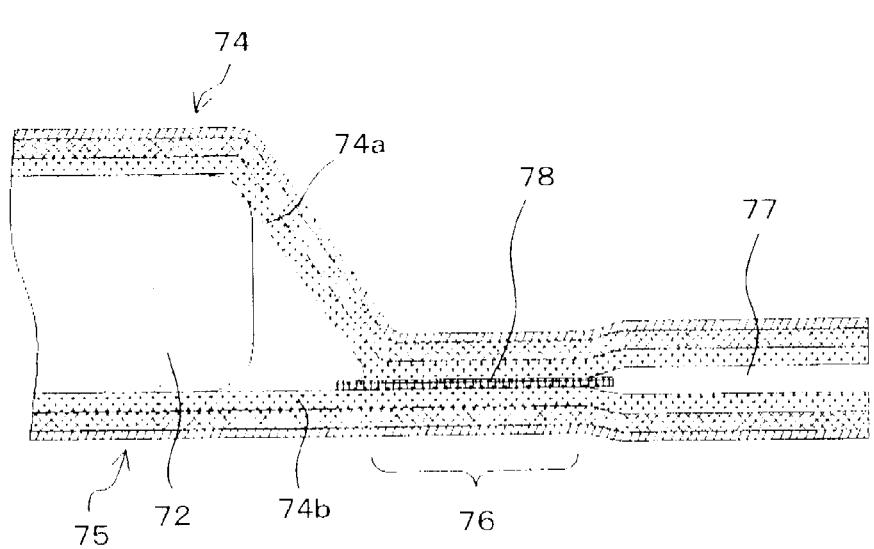
FIG. 16 is a cross-sectional view of a region near a heat-sealed area of a film-encased cell according to a further embodiment of the present invention.

In the above example, the cross-linked structure is provided in the encasing films. Alternatively, a cross-linked structure may not be provided in the encasing films, but may be formed by sandwiching a cross-linked resin sheet between the films that face each other, or stated otherwise, by fusing a cross-linked resin sheet to one of encasing films that face each other. Such an embodiment is shown in FIG. 16 which illustrates a region near a heat-sealed area. In the embodiment shown in FIG. 16, cross-linked resin sheet 78 is sandwiched between two encasing films 74, 75 in a portion of heat-sealed area 76. Resin sheet 78 has a portion exposed to a cell element housing which accommodates cell element 72 and another portion exposed to gas releaser 77. Insofar as such conditions are met, the size and shape of resin sheet 78 are not limited, and other structural details may be arranged in the same manner as in the above embodiments.

Resin sheet 78 is thermally fused to either one of encasing films 74, 75 that face each other before encasing films 74, 75 are thermally fused to each other. Resin sheet 78 should preferably be made of the same resin as heat-sealable resin layers 74a, 75a of encasing films 74, 75 in order to achieve a minimum fusion strength required to seal cell element 72. Resin sheet 78 may be in the form of a film or a mesh. If resin sheet 78 is in the form of a mesh, then a required fusion strength can be achieved by an anchoring effect which is caused when heat-sealable resin layers 74a, 75a melted by thermal fusion enter the interstices of resin sheet 78. The fusion strength of encasing films 74, 75 can also be controlled by appropriately adjusting the degree of cross-linking regardless of form of resin sheet 78. Heat-sealed area 76 is peeled off along either an interface between one of encasing films 74 and resin sheet 78 or other encasing film 75 and resin sheet 78. In either case, peeling progresses in the region involving resin sheet 78.

The cross-linked structure provided by resin sheet 78 offers the same advantages as those of the above embodiments. According to the present embodiment, in particular, since the cross-linked structure is provided by resin sheet 78 which is different from encasing films 74, 75, it is easy to determine whether a cross-linked structure is provided in encasing films 74, 75. Therefore, parts management during the manufacturing process is facilitated, and a wider choice of materials that can be used for encasing films 74, 75 (particularly heat-sealable resin layers 74a, 75a) is available.

Typical embodiments of the present invention have been described above. However, the present invention is not limited to those embodiments, but changes may be made within the scope of the technical idea of the present invention.

For example, in some of the above embodiments, a cross-linked structure is provided in one of two encasing films. However, cross-linked structures may be provided in both encasing films if they can produce sufficient bonding forces for sealing the cell element. In such a case, the doses of electron beams applied to the respective encasing films may be equal to or different from each other. If such an arrangement is applied to the embodiment shown in FIG. 16, then cross-linked resin sheets are fused respectively to the encasing films.

In the above embodiments, the two encasing films sandwich the cell element from its opposite sides in the thickness direction and are thermally fused along their four sides. Alternatively, a single encasing film may be folded over on itself to provide two leaves, which may be placed to sandwich the cell element and thermally fused along their open three sides thereby to seal the cell element.

In the above embodiments, the cell element is of a laminated structure wherein a plurality of positive poles and a plurality of negative poles are alternately laminated. However, there may be employed a wound cell element having positive and negative poles alternately arranged such that positive poles, negative poles, and separators are constructed as strips, the positive poles and the negative poles are superposed with the separators interposed therebetween, and they are wound and thereafter compressed to a flat shape.

Desired cell elements for use in ordinary cells are applicable insofar as they include positive poles, negative poles, and an electrolyte. A cell element used in a general lithium ion secondary cell comprises positive pole plates each having an aluminum foil having opposite surfaces coated with a positive pole active material such as lithium manganese composite oxide, lithium cobalt oxide, or the like, and negative plates each having a copper foil having opposite surfaces coated with a carbon material that can be doped and undoped with lithium, the positive pole plates and the negative pole plates being disposed in facing relation to each other with separators interposed therebetween, the assembly being impregnated with an electrolytic solution including a lithium salt. Other cell elements that can be used include cell elements for use in other types of chemical cells such as a nickel hydrogen cell, a nickel cadmium cell, a lithium metal primary or secondary cell, a lithium polymer cell, etc. The present invention is also applicable to an electric device having an electric device element capable of storing electric energy therein and generating gas based on a chemical reaction or a physical reaction, e.g., a capacitor such as an electric double layer capacitor or a capacitive element such as an electrolytic capacitor.

In the above embodiments, the positive pole tab and the negative pole tab extend from one side of the film-encased cell. However, the positive pole tab and the negative pole tab may extend from different sides, e.g., opposite two sides or adjacent two sides, of the film-encased cell.

The invention claimed is:

1. A film-encased electric device comprising:
an electric device element having a positive pole tab and a negative pole tab connected thereto;
encasing films having at least respective heat-sealable resin layers and which surround said electric device element with the heat-sealable resin layers that face each other, the facing heat-sealable resin layers being thermally fused to each other along outer peripheral regions thereof to provide a heat-sealed area therealong, said encasing films having an inner space therebetween that serves as an electric device element housing which accommodates said electric device element sealed therein, with said positive pole tab and said negative pole tab extending from said electric device element; and
a pressure releaser disposed in a portion of said heat-sealed area on a side from which said positive pole tab and said negative pole tab extend, between said positive pole tab and said negative pole tab, or on a side different from the side from which said positive pole tab and said negative pole tab extend, said pressure releaser being arranged to allow said thermally fused encasing films to peel off progressively more preferentially therein than other regions due to internal pressure buildup in said electric device element housing;
said pressure releaser having a cross-linked structure made of a cross-linked resin with a lower peel strength than the rest of the heat-sealed area and disposed in a continuous region in which said cross-linked structure has a portion exposed to said electric device element housing and another portion held in contact with ambient air.

2. The film-encased electric device according to claim 1, wherein said heat-sealed area has a projecting sealed portion projecting toward said electric device element housing, said cross-linked structure being disposed in a range including said projecting sealed portion.

3. The film-encased electric device according to claim 2, wherein said heat-sealed area is formed in said encasing films to provide a bay-shaped non-heat-sealed region in contact with said electric device element housing, said projecting sealed portion being positioned in said non-heat-sealed region.

4. The film-encased electric device according to claim 1, further comprising a gas releaser disposed in outer peripheral regions of said encasing films, said gas releaser being vented to ambient air and not held in contact with said electric device element housing, said cross-linked structure including a region held in contact with said gas releaser as said other portion held in contact with ambient air.

5. The film-encased electric device according to claim 4, wherein said gas releaser is provided as a region in which the encasing films that face each other are not thermally fused to each other.

6. The film-encased electric device according to claim 5, further comprising a tube connected to said gas releaser.

7. The film-encased electric device according to claim 6, wherein said tube is sandwiched between the encasing films that face each other and has an outer peripheral surface bonded to said encasing films.

8. The film-encased electric device according to claim 7, wherein said tube is made of the same resin as the resin of said heat-sealable resin layers and is bonded to said encasing films by thermal fusion.

9. The film-encased electric device according to claim 1, wherein said cross-linked structure is provided by cross-linking the heat-sealable resin layer of said encasing film.

10. The film-encased electric device according to claim 1, wherein said cross-linked structure is provided by a cross-linked resin sheet fused to said encasing film.

11. The film-encased electric device according to claim 1, wherein the cross-linked structure is only formed in the vicinity of the pressure releaser.

12. The film-encased electric device according to claim 1, wherein the pressure releaser is configured to release pressure of 0.05 MPa to 1 MPa from the film-encased electric device.

13. The film-encased electric device according to claim 1, wherein the pressure released by the pressure releaser is inversely related to the degree of cross-linking in the cross-linked structure.

14. A method of manufacturing a film-encased electric device having an electric device element that has a positive pole tab and a negative pole tab connected thereto and surrounded by encasing films having at least respective heat-sealable resin layers and having respective outer peripheral regions thermally fused to each other to provide a heat-sealed area, said encasing films having an inner space therebetween serving as an electric device element housing which accommodates said electric device element sealed therein, with said positive pole tab and said negative pole tab extending from said electric device element, said method comprising the steps of:

forming a cross-linked structure made of a cross-linked resin in a continuous region including a portion of said heat-sealed area of the encasing films, on a side of at least one of said encasing films from which said positive pole tab and said negative pole tab extend, between said positive pole tab and said negative pole tab, or on a side different from the side from which said positive pole tab and said negative pole tab extend, said cross-linked structure having a portion exposed to said electric device element housing and another portion held in contact with ambient air;

surrounding said electric device element between said encasing films with said cross-linked structure formed therein, said heat-sealable resin layers facing each other around said electric device element, with said positive pole tab and said negative pole tab extending from said electric device element; and thermally fusing the outer peripheral regions of said encasing films which surround said electric device element sandwiched therebetween to seal said electric device element, thereby forming a pressure releaser in a region including the region in which said cross-linked structure is formed, for allowing said thermally fused encasing films to peel off progressively more preferentially therein than other regions due to internal pressure buildup in said electric device element housing, wherein said cross-linked structure has a lower peel strength than the remainder of the thermally fused encasing films.

15. The method according to claim 14, wherein said step of thermally fusing the outer peripheral regions comprises the step of forming a gas releaser that vents to ambient air, from the outer edges of said encasing films to said other portion of said cross-linked structure, by providing a region in which said encasing films are not thermally fused.

16. The method according to claim 14, wherein said step of forming a cross-linked structure comprises the step of applying an electron beam to a region of said encasing films in which said cross-linked structure is to be formed.

17. The method according to claim 15, further comprising the step of connecting a tube to said gas releaser.

18. The method according to claim 17, wherein said step of connecting a tube comprises the steps of sandwiching said tube between the encasing films that face each other and bonding said tube and said encasing films to each other.

19. The method according to claim 14, wherein said step of forming a cross-linked structure comprises the step of cross-linking the heat-sealable resin layer of said encasing film.

20. The method according to claim 14, wherein said step of forming a cross-linked structure comprises the step of fusing a cross-linked resin sheet to said encasing film.

* * * * *